United States Patent
Bjoerk et al.

[11] Patent Number: 5,249,789
[45] Date of Patent: Oct. 5, 1993

[54] SHEET FILM MAGAZINE FOR A FILM CHANGER

[75] Inventors: Erik Bjoerk, Syndbyberg; Ola Wiklund, Jaerfaella; Johan Egerstroem, Nacka, all of Sweden

[73] Assignee: Siemens Aktiengesellschaft, Munich, Fed. Rep. of Germany

[21] Appl. No.: 3,678

[22] Filed: Jan. 13, 1993

Related U.S. Application Data

[63] Continuation of Ser. No. 774,625, Oct. 10, 1991, abandoned.

[30] Foreign Application Priority Data

Oct. 22, 1990 [SE] Sweden .................. 9003370

[51] Int. Cl.⁵ ..................... B65H 3/06
[52] U.S. Cl. ................. 271/115; 271/118; 271/119; 271/121; 271/126; 271/161; 271/167; 271/160; 271/165
[58] Field of Search ............... 271/114–119, 271/121, 126, 160, 161, 165–167, 95, 100, 101

[56] References Cited

U.S. PATENT DOCUMENTS

| | | | |
|---|---|---|---|
| 2,601,984 | 7/1952 | Pope | 271/95 |
| 2,849,232 | 8/1958 | Halahan et al. | 271/101 X |
| 3,234,796 | 2/1966 | Leonards | 73/422 |
| 3,497,205 | 2/1970 | Harrison | 271/166 |
| 3,514,098 | 5/1970 | Ostwald | 271/118 X |
| 3,861,667 | 1/1975 | Jahme | 271/95 X |
| 3,869,116 | 3/1975 | Kroeker | 271/160 |

FOREIGN PATENT DOCUMENTS

| | | |
|---|---|---|
| 0006780 | 1/1980 | European Pat. Off. . |
| 0402492 | 12/1990 | European Pat. Off. . |
| 1140451 | 11/1962 | Fed. Rep. of Germany . |
| 2007594 | 9/1970 | Fed. Rep. of Germany . |
| 2747623 | 3/1984 | Fed. Rep. of Germany . |
| 132235 | 10/1981 | Japan ............ 271/114 |
| 87137 | 5/1985 | Japan ............ 271/165 |
| 123730 | 5/1988 | Japan ............ 271/117 |
| 193830 | 7/1990 | Japan ............ 271/114 |
| 472683 | 6/1969 | Switzerland . |
| 686927 | 2/1953 | United Kingdom ............ 271/101 |
| 1397379 | 6/1975 | United Kingdom . |

OTHER PUBLICATIONS

Brinson et al, "Spring-Mass System for the Prevention of Hopper Misfeeds", Nov. 1974, IBM Tech. Disclosure Bull., vol. 17, No. 6, p. 1732.

*Primary Examiner*—Robert P. Olszewski
*Assistant Examiner*—Boris Milef
*Attorney, Agent, or Firm*—Hill, Steadman & Simpson

[57] ABSTRACT

A sheet film magazine for a film changer has a conveyor for conveying individual film sheets from a film stack to an exposure or receptacle portion of the film changer. The conveyor comprises at least one conveyor wheel which is attached to a shaft that is parallel to the plane of the film sheets and which is driven with a drive mechanism in the conveying direction of the film sheets. The conveyor also has a spacing mechanism for spacing between a film sheet and the conveyor wheel such that the conveyor wheel, when conveying a film sheet from the sheet film magazine to the exposure or receptacle portion, presses against the surface of the film sheet, and is removed from this surface after the end of the film conveying. In order to enable a high film conveying frequency with a conveyor of this type in a simple way, following the end of a film conveying, the conveyor wheel is separated from the surface of the film sheet with the assistance of a separating mechanism.

15 Claims, 3 Drawing Sheets

SHEET FILM MAGAZINE FOR A FILM CHANGER

This is a continuation of application Ser. No. 774,625, filed Oct. 10, 1991 now abandoned.

BACKGROUND OF THE INVENTION

The invention is directed to a sheet film magazine for a film changer comprising a conveyor means for conveying individual sheets of film from a film stack to the exposure portions of the film changer. The conveyor means comprises at least one conveyor wheel which is attached to a shaft parallel to the plane of the sheets of film and which is driven in the conveying direction of the sheets of film with drive means. The conveyor means also comprises means that vary the spacing between a sheet of film and the conveyor wheel such that the conveyor wheel, when conveying a sheet of film from the sheet film magazine to the exposure portion, presses against the surface of the sheet of film and is removed from the surface of the sheet of film after the film conveying has ended.

A sheet film magazine of this type that is not provided for a film changer is disclosed by German Published Application 2 747 623. The conveyor means of the sheet film magazine comprises a pressure plate which is secured to the one end of an arm that proceeds along nearly the entire loading part of the magazine and whose other end is seated rotatably around an axis. The pressure plate together with the arm are arranged above the film stack or the sheet of film. A conveyor wheel is attached under the film stack. When conveying a sheet of film from the sheet film magazine, the arm together with the pressure plate is pivoted down against the end of the film stack which lies above the conveyor wheel. When the pressure plate presses against the film stack, the latter is pressed against the conveyor wheel, as a result whereof the undermost sheet of film of the film stack can be conveyed. Subsequently, the pressure plate is lifted up with the assistance of two supporting arms that proceed in parallel. The one end of each supporting arm runs on a rail which is attached to the floor of the magazine. The other ends of the supporting arms each respectively carry a roller that presses against the arm of the pressure plate. The supporting arms are thus displaceable along the entire length of the pressure plate arm. When the pressure plate presses against the film stack, the supporting arms together with the rollers are situated in the region of the axis around which the arm is turned. When a sheet of film has been conveyed out of the magazine, the supporting arms are displaced in the direction of the pressure plate, whereby the pressure plate lifts off from the film stack. When conveying the next sheet of film, the supporting arms are displaced in the direction of the axis around which the pressure plate arm can be turned, whereby the pressure plate again presses against the film stack. The relatively complicated and long-distanced displacement of the supporting arms for controlling the motions of the pressure plate that has just been described is time-consuming, so that a high film conveying frequency required in a film changer is not possible with this conveyor means.

U.S. Pat. No. 3,234,796 discloses an x-ray film changer having a conveyor means for conveying sheets of film from the exposure part to the reception cassette. The conveyor means which is attached in front of the film entry opening of the reception cassette contains a conveyor wheel and a pressure roller. The pressure roller can be brought into a first position in which it presses against the conveyor wheel and can be brought into a further position in which it is arranged at a distance from the conveyor wheel. The pressure roller is secured to an end of a lever arm at whose other end a control roller is arranged, this control roller running under spring pressure on a cam plate that is provided with two cams. When the cam plate has a position wherein the control roller lies against the cam, the lever arm is turned around a shaft such that the pressure roller presses against the conveyor wheel. When the cam plate is subsequently turned into a position between the cams, the lever arm is turned around its axis such that the pressure roller lifts off from the conveyor wheel. The control of the pressure roller is dependent on the length of the cams, this meaning that the control roller must run along the entire cam length before the pressure roller lifts off from the conveyor wheel. This can prevent a high film conveying frequency.

SUMMARY OF THE INVENTION

An object of the invention is to create a sheet film magazine comprising a conveyor means of the type initially cited which allows a relatively high film conveying frequency in a simple way.

This object is inventively achieved in that the conveyor wheel—after the end of a film conveying—is separated from the surface of the sheet of film with the assistance of parting elements before it is removed from this surface by the parting means. This means that the conveyor wheel is removed from the film surface immediately after the conveying of a film, as a result whereof a new sheet of film can be quickly brought into a starting position for the conveying.

It is proposed in an advantageous development of the invention that the means which vary the spacing between the sheet of film and the conveyor wheel contains a roller arranged in the magazine, this roller pressing against a cam plate that is shaped such that with the assistance of the roller, the conveyor wheel presses against the surface of the sheet of film in a first position and lifts off from this surface in a further position.

In an advantageous development of the invention, the roller is quickly brought out of its position by the parting element at the moment at which the cam plate starts to turn opposite the film conveying direction, so that the conveyor wheel is separated from the surface of the sheet of film. As a result thereof, the described, immediate separation of the conveyor wheel from the surface of the sheet of film is achieved.

In an especially beneficial embodiment, the parting element comprises a rocker which is rotatable around an axis and at which a roller is arranged rotatable around a second axis. As a result of the rocker, the roller can be quickly and simply laterally displaced out of its position against the cam plate such that the conveyor wheel immediately lifts off from the surface of the sheet of film.

In view of a structurally simple design of the invention, it is recommended that the cam plate be secured to the same shaft around which the conveyor wheel is rotatably arranged. The invention can be developed further in that the motions of the conveyor wheel and of the cam plate are influenced by a toothed wheel which is firmly arranged at the common shaft of the conveyor wheel and of the cam plate, and whereby the motions of the toothed wheel are controlled with a toothed rack. A comparatively simple and compact conveyor means for sheets of film is established on the basis of such a structure.

In an advantageous development of the invention, it is proposed that the cam plate is a round disc having a recess for the roller. In this embodiment, the roller can be quickly moved out of the recess by turning the cam plate. What is thereby achieved is that the roller together with the cam plate itself influences the conveyor wheel such that it is quickly brought from a parking position wherein it is not in communication with a sheet of film into a position wherein it presses against the surface of the sheet of film.

It is proposed in view of a further development of the invention that the sheet film magazine is provided with a control mechanism following the exit side. This control mechanism guarantees that respectively only one sheet of film is conveyed out of the sheet film magazine at one time. The control mechanisms comprise the film exit opening whose height amounts to less than the thickness of two sheets of film, and also comprises at least one hold-down means which is attached in the sheet film magazine following the film exit opening and which presses at least one sheet of film against a film plane. This extremely simple structure of the control mechanism guarantees that only one sheet of film is conveyed out of the sheet film magazine. The hold-down means controls the sheets of film such that the front edge of those sheets of film which are to be conveyed out of the magazine come to lie exactly in front of the film exit opening that, due to its height dimension, allows only respectively one sheet of film to pass.

DESCRIPTION OF THE PREFERRED EMBODIMENTS

Figure 1:
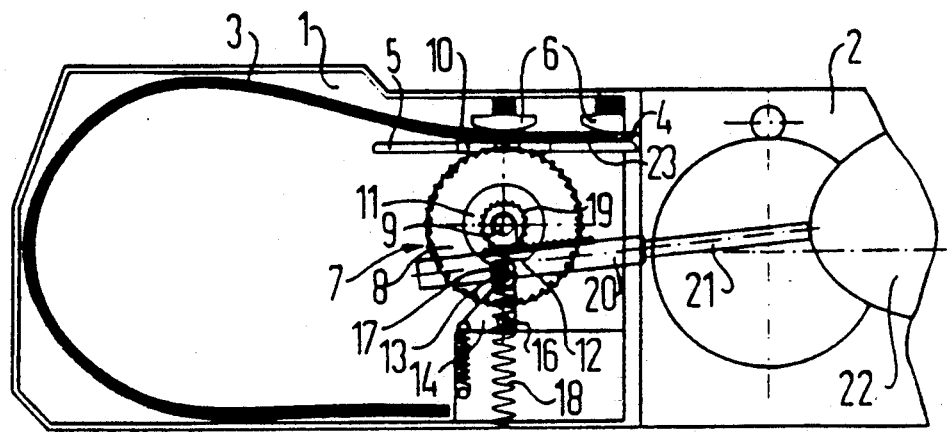
FIGS. 1 through 4 show side views of a sheet film magazine comprising a conveyor means of the invention, whereby the conveyor means is shown in different positions.

FIG. 1 shows a sheet film magazine 1 that is connected to the exposure, receptacle, or receiving portion 2 of a film changer. The sheet film magazine 1 is loaded with a film stack 3 that is arranged in C-shaped fashion in the magazine. The front end of the film stack 3, i.e. the end that lies against the film exit opening 4 of the sheet film magazine, is clamped between a film plane 5 and schematically shown pressure parts for the film sheets in the form of spring-loaded plates 6. The film plane 5 on which the film stack 3 rests proceeds up to an exit opening for the sheets of film. A conveyor means 7 is attached in axial alignment therewith following the film exit opening 4 and under the film plane 5. The conveyor means 7 comprises a conveyor wheel 8 that is arranged on a shaft 9 parallel to the film plane 5 and that can be brought into communication with the film stack 3 through an opening 10 in the film plane 5. The conveyor wheel 8 can preferably be a toothed wheel. A cam plate is also secured to the shaft 9, this cam plate being composed of a round disc 11 having a recess 12 for a roller 13 that, with the assistance of a rocker 14, is caused to press against the disc 11. The rocker 14 is rotatable around an axis 16 secured to the magazine. The roller 13 that is attached to the rocker 14 is rotatable around a second axis 17. The axes 16, 17 of the roller 13 and of the rocker 14 are arranged in axial alignment with the common shaft 9 for the conveyor wheel 8 and the cam plate, and are arranged perpendicular to the film plane 5. The conveyor wheel 8 as well as the disc 11 are spring-loaded with the assistance of a spring 18 whose one end is secured to the shaft 9 and whose other end is secured to the floor of the sheet film magazine 1, being spring-loaded such that the disc 11 presses against the roller 13. A toothed wheel 19 is also secured to the shaft 9, this toothed wheel 19 being in engagement with a toothed rack 20 that is in turn secured to a further rack 21 which is controlled by an eccentric 22 arranged in the exposure or receptacle portion 2.

The conveyor means 7 is shown in its parked position in FIG. 1, this meaning that the conveyor wheel 8 is separated from the undermost sheet of film of the film stack 3. In order for this position to be achieved, the roller 13 must lie in the recess 12 of the disc 11.

Figure 2:
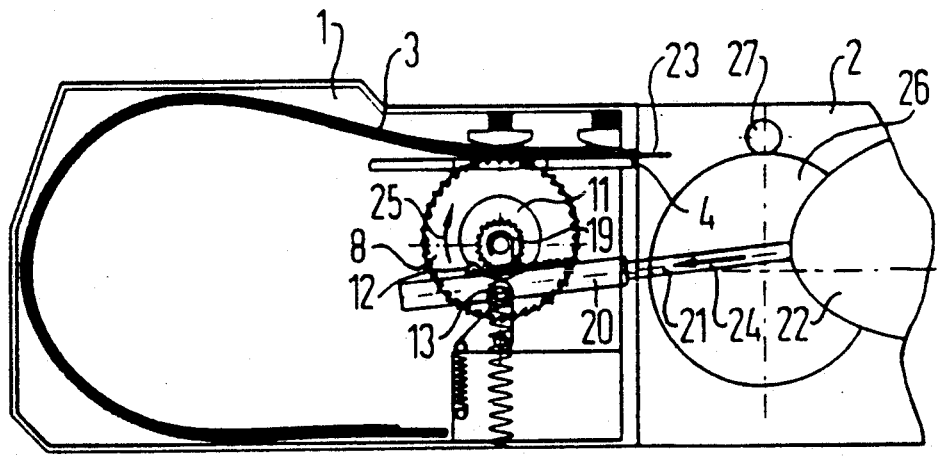
Figure 3:
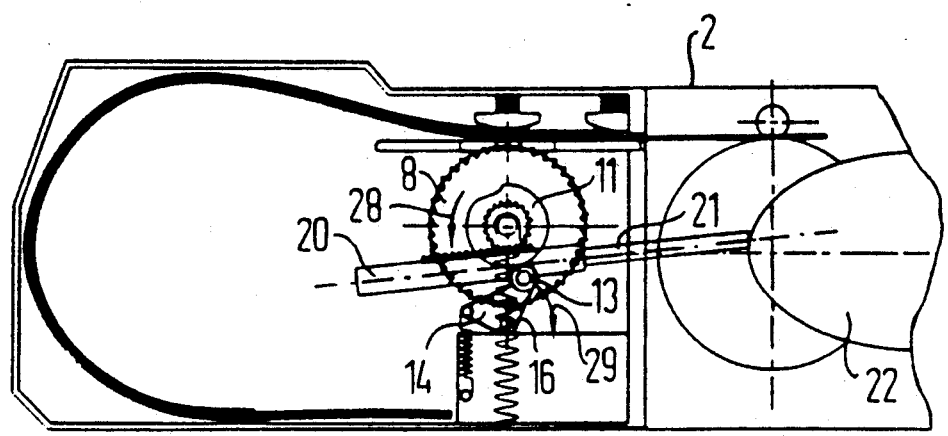

When the film sheet 23 is to be separated from the film stack and is to be conveyed into the exposure or receptacle part 2, the rack 21 and the toothed rack 20 are pressed in the direction of the arrow 24 with the assistance of the eccentric 22, whereby the toothed rack 20 influences the toothed wheel 19 such that it is turned in the direction of the arrow 25 (FIG. 2). At the same time, the disc 11 as well as the conveyor wheel 8 are co-rotated in the same direction. Due to the rotation of the disc 11, the roller 13 immediately leaves its position in the recess 12 and now presses the disc 11, and thus the conveyor wheel 8, in an upward direction at the same time, as a result whereof the latter presses against the surface of the film sheet 23. In this way, the conveyor wheel 8 conveys the film sheet through the film exit opening 4 into the exposure or receptacle portion 2 up to further conveyor wheels 26, 27 which grasp the leading edge of the film sheet and convey it in a forward direction for an exposure. The conveyor wheel 8 is provided with a free-wheeling wheel, so that it does not decelerate during the rapid, continued conveying by the further conveyor wheels 26, 27, but rolls along with the same speed. When the toothed rack 20 has now been displaced into its outermost position, the disc 11 has assumed a position shown in FIG. 3. It is also shown in FIG. 3 that the toothed rack 20—when it has reached an outermost position—is displaced in the opposite direction, i.e. in the direction of the exposure or receptacle portion 2 due to the influence of the rack 21 and of the eccentric 22. At that moment at which the toothed rack, and thus the disc 11 as well, change direction, as shown by the arrow 28, the roller 13 is immediately brought out of its position. For that purpose, the rocker 14 is rotated around the axis 16 in the direction of the arrow 29. The conveyor wheel 8 simultaneously leaves the surface of the film sheet. The roller 13 is provided with a free-wheeling wheel arrangement and runs along the disc 11 when this is turned in a film conveying direction. When the disc 11 is turned in the opposite direction, then the roller 13 blocks and slides out of its position.

Figure 4:
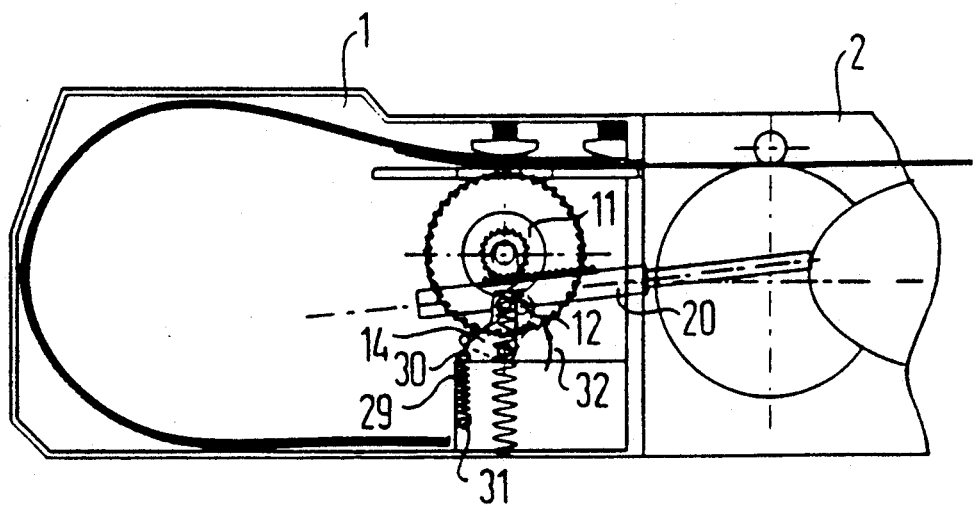

FIG. 4 shows that the disc 11 is turned back by the means already set forth, so that the recess thereof is brought into a position wherein the roller 13 engages into this recess 12 on the basis of the rocker 14. The rocker 14 is turned back into its original position. This occurs with a spring 29 whose one end is secured to a peg 30 attached to the rocker 14, and whose other end is secured to a peg 31 arranged at the magazine. The rocker 14 shown in dot-dash lines in this figure and the arrow 32 are intended to show the rotation of the rocker 14 from the position shown in FIG. 3 into a parking position.

Only one conveyor means 7 is described in this exemplary embodiment. Of course, it is advantageous to employ two conveyor means 7 which are attached to the ends of the same shaft 9 that extends over the entire width of the sheet film magazine 1.

The described cycle is repeated for each film sheet which is to be conveyed from the magazine 1 to the exposure or receptacle part 2. An extremely high film conveying frequency is possible due to the rapid separation of the conveyor wheel 8 from the surface of the film sheet even before the recess of the disc 11 has reached its parking position wherein the roller 13 engages into the recess 12.

Figure 5:
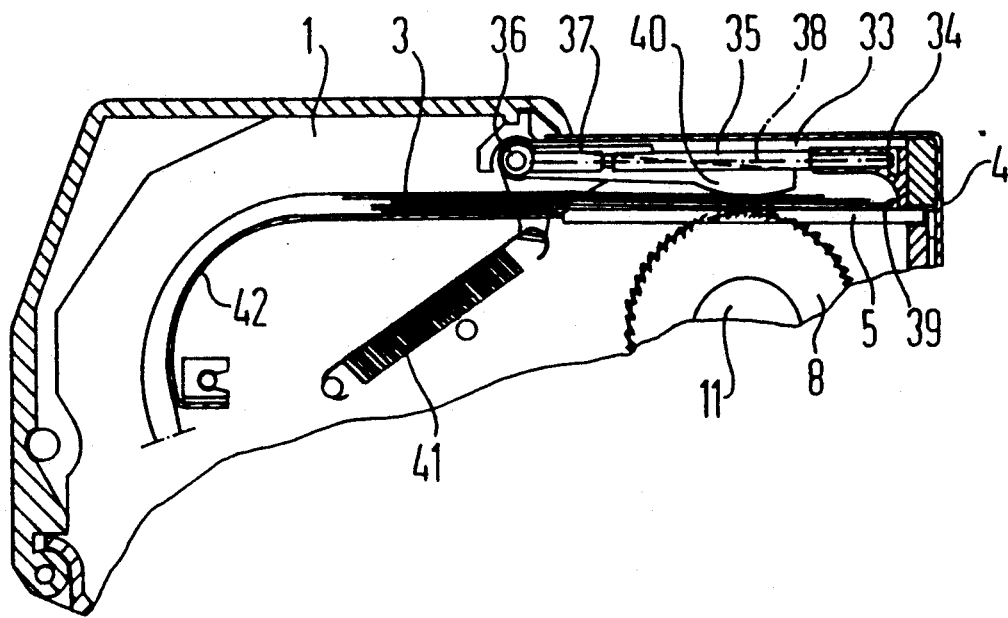
FIG. 5 illustrates a control mechanism for film sheets.

It is shown in FIG. 5 that the sheet film magazine 1 is provided with a control mechanism for the film sheets arranged following the film exit side. The control mechanism comprises a film exit opening 4 whose height amounts to less than the thickness of two sheets of film and comprises at least one spring-loaded, first hold-down means 33 that is attached following the film exit opening 4. The first hold-down means 33 comprises a head 34 that is secured to one end of a shaft 35 that proceeds approximately parallel to the film plane 5 and whose free end is rotatable around an axis 36. The shaft 35 is loaded by a spring 37, so that the shaft presses the head 34 against the film plane 5. The head 34 is also rotatable around the longitudinal axis 38 of the shaft 35. Moreover, the seating surface of the head 34 that presses against the film plane when the magazine is empty is rounded off or, respectively, beveled at the edge 39 that faces away from the film exit opening 4. A second hold-down means 40 is provided opposite the conveyor wheel 8, this second hold-down means 40 comprising an elongated part that is attached to the axis 36 of the first hold-down means 33. The second hold-down means 40 is spring-loaded with a tension spring 41.

When loading the sheet film magazine with a film stack 3, the one end of the film stack 3 is pressed between the film plane 5 and the second hold-down means 40 up to the head 34 of the first hold-down means 33. The rest of the length of the film stack 3 is placed against the curved sheet metal part 42 in the sheet film magazine. In this position, the second hold-down means 40 presses against the uppermost film sheet of the film stack 3, so that the undermost film sheet presses against the conveyor wheel 8. When the conveyor wheel 8 is driven in a conveying direction of the film sheets, the undermost film sheet is pushed against the head 34 and lifts this, due to the rounded or respectively beveled edge 39. The head 34 now presses against the surface of the film sheet, so that the leading end thereof lies precisely in front of the film exit opening 4. Even when two or three film sheets are simultaneously conveyed and slide under the head 34, all film sheets except the undermost one strike the wall above the film exit opening 4. When the undermost film sheet has been conveyed out of the magazine 1, the head 34, due to the spring power, presses against the surface of the next, undermost film sheet until this sheet comes to lie exactly in front of the film exit opening 4, as a result whereof this film sheet can be conveyed out. The spring loading of the first hold-down means 33 is matched such that the head 34 can press a film sheet that presses down against the wall and simultaneously allows the film sheet to be conveyed out of the film exit opening 4 without the head 34 decelerating the film sheet.

As a consequence of the tension spring 41 for the second hold-down means 40, a constant force against the film stack 3 is obtained, regardless of the thickness of the film stack 3. The size of the spring force of the tension spring 41 is also adapted to the necessary force which is required so that the teeth of the conveyor wheel 8 grasp the undermost film sheet of the film stack 3.

The described control mechanism 4, 34 guarantees that respectively only one sheet film is conveyed out of the magazine at one time.

Although various minor changes and modifications might be proposed by those skilled in the art, it will be understood that we wish to include within the claims of the patent warranted hereon all such changes and modifications as reasonably come within our contribution to the art.

We claimed as our invention:

1. A sheet film magazine for a film changer, comprising:
   a conveyor means for conveying individual film sheets from a film stack to a receiving portion of the film changer;
   the conveyor means having at least one conveyor wheel attached to a shaft parallel to a plane of the film sheets and driver means for rotating the conveyor wheel in a conveying direction of the film sheets during conveying and for rotating the conveyor wheel in an opposite direction after a film sheet has been conveyed;
   the conveyor means having spacing means for varying a spacing between a film sheet and the conveyor wheel such that the conveyor wheel, when conveying a film sheet from the sheet film magazine to the receiving portion, presses against a surface of the film sheet; and
   separating means for separating the conveyor wheel from the surface of the film sheet quickly when the conveyor wheel begins reverse rotation in the opposite direction.

2. A sheet film magazine according to claim 1 wherein the conveyor wheel is a toothed wheel.

3. A sheet film magazine according to claim 1 wherein the conveyor wheel is arranged in a region of a film exit opening.

4. A sheet film magazine according to claim 1 further including a sheet control means at a film exit side of the magazine for guaranteeing that respectively only one film exit opening.

5. A sheet film magazine for a film changer, comprising:
   a conveyor means for conveying individual film sheets from a film stack to a receiving portion of the film changer;
   the conveyor means having at least one conveyor wheel attached to a shaft parallel to a plane of the film sheets and drive means for driving the conveyor wheel in a conveying direction of the film sheets during conveying and for driving the conveyor wheel in an opposite direction after a film sheet has been conveyed;
   the conveyor means having spacing means for varying a spacing between a film sheet and the conveyor wheel such that the conveyor wheel, when conveying a film sheet from the sheet film magazine to the receiving portion, presses against a surface of the film sheet;

separating means for separating the conveyor wheel from the surface of the film sheet quickly when the conveyor wheel begins reverse rotation in the opposite direction; and the spacing means containing a roller which is positioned to press against a cam that is shaped such that, with assistance of the roller, the conveyor wheel presses against the surface of the film sheet in a first position and lifts off from its surface in a second position.

6. A sheet film magazine according to claim 5 wherein the separating means includes a parting element means for quickly bringing the roller out of its position at the moment at which the conveyor wheel starts to turn in said opposite direction, so that the conveyor wheel is separated from the surface of the film sheet.

7. A sheet film magazine according to claim 6 wherein the parting element means comprises a rocker element that is rotatable around an axis and wherein said roller is arranged rotatable around a second axis mounted to said rocker element.

8. A sheet film magazine according to claim 7 wherein axes of the roller and of the rocker element lie in parallel with the shaft of the conveyor wheel and perpendicularly relative to the conveying direction of the film sheet.

9. A sheet film magazine according to claim 5 wherein one of the conveyor wheel and cam are spring loaded such that a force is exerted on these in a direction toward the roller.

10. A sheet film magazine according to claim 5 wherein the cam is a round disc having a recess shaped and positioned to receive the roller.

11. A sheet film magazine for a film changer, comprising:

a conveyor means for conveying individual film sheets from a film stack to a receiving portion of the film changer;

the conveyor means having at least one conveyor wheel attached to a shaft parallel to a plane of the film sheets and drive means for driving the conveyor wheel in a conveying direction of the film sheets during conveying and for driving the conveyor wheel in an opposite direction after a film sheet has been conveyed;

the conveyor means having spacing means for varying a spacing between a film sheet and the conveyor wheel such that the conveyor wheel, when conveying a film sheet from the sheet film magazine to the receiving portion, presses against a surface of the film sheet;

separating means for separating the conveyor wheel from the surface of the film sheet when the conveyor wheel reverse to the opposite direction;

the spacing means containing a roller which is positioned to press against a cam that is shaped such that, with assistance of the roller, the conveyor wheel presses against the surface of the film sheet in a first position and lifts off from its surface in second position;

the separating means including a parting element means for quickly bringing the roller out of its position at the moment at which the conveyor wheel starts to turn in said opposite direction, so that the conveyor wheel is separated from the surface of the film sheet;

the parting element means comprising a rocker element that is rotatable around an axis and wherein said roller is arranged rotatable around a second axis mounted to said rocker element; and the cam being secured to the same shaft around which the conveyor wheel is rotatably arranged.

12. A sheet film magazine for a film changer, comprising:

a conveyor means for conveying individual film sheets from a film stack to a receiving portion of the film changer;

the conveyor means having at least one conveyor wheel attached to a shaft parallel to a plane of the film sheets and drive means for driving the conveyor wheel in a conveying direction of the film sheets during conveying and for driving the conveyor wheel in an opposite direction after a film sheet has been conveyed;

the conveyor means having spacing means for varying a spacing between a film sheet and the conveyor wheel such that the conveyor wheel, when conveying a film sheet from the sheet film magazine to the receiving portion, presses against a surface of the film sheet;

separating means for separating the conveyor wheel from the surface of the film sheet when the conveyor wheel reverses to the opposite direction;

the spacing means containing a roller which is positioned to press against a cam that is shaped such that, with assistance of the roller, the conveyor wheel presses against the surface of the film sheet in a first position and lifts off from its surface in a second position; and a toothed wheel means being provided for causing rotation of the conveyor wheel and of the cam, said toothed wheel means being rigidly arranged at a common shaft of the conveyor wheel and of the cam, and wherein a toothed rack means is provided for controlling rotation of the toothed wheel means.

13. A sheet film magazine according to claim 12 wherein eccentric means is provided for controlling motion of the toothed rack means.

14. A sheet film magazine for a film changer, comprising:

a conveyor means for conveying individual film sheets from a film stack to a receiving portion of the film changer;

the conveyor means having at least one conveyor wheel attached to a shaft parallel to a plane of the film sheets and driver means for rotating the conveyor wheel in a conveying direction of the film sheets during conveying and for rotating the conveyor wheel in an opposite direction after a film sheet has been conveyed;

the conveyor means having spacing means for varying a spacing between a film sheet and the conveyor wheel such that the conveyor wheel, when conveying a film sheet from the sheet film magazine to the receiving portion, presses against a surface of the film sheet;

separating means for separating the conveyor wheel from the surface of the film sheet when the conveyor wheel reverses rotation to the opposite direction;

a sheet control means at a film exit side of the magazine for guaranteeing that respectively only one film sheet is conveyed out of the sheet film magazine at a time; and the sheet control means including a film exit opening whose height is less than a thickness of two sheets of film, and at least one first hold-down means attached in the sheet film magazine adjacent the film exit opening for pressing at least one film sheet against a film plane member supporting the film sheets.

15. A sheet film magazine for a film changer, comprising:

a conveyor means for conveying individual film sheets from a film stack to another region of the film changer;

the conveyor means having at least one conveyor wheel attached to a shaft parallel to a plane of the film sheets and drive means for driving the conveyor wheel in a conveying direction of the film sheets during conveying and for driving the conveyor wheel in an opposite direction after a film sheet has been conveyed;

the conveyor means having spacing means for varying a spacing between a film sheet and the conveyor wheel such that the conveyor wheel, when conveying a film sheet from the sheet film magazine to the receiving portion, presses against a surface of the film sheet; and separating means for quickly separating the conveyor wheel from the surface of the film sheet at a time when the conveyor wheel begins to be driven in said opposite direction.

* * * * *